(12) United States Patent
Engelmann et al.

(10) Patent No.: US 8,479,901 B2
(45) Date of Patent: Jul. 9, 2013

(54) HYDRODYNAMIC TORQUE CONVERTER

(75) Inventors: Dominique Engelmann, Offendorf (FR); Markus Werner, Buehl (DE); Stephan Maienschein, Baden-Baden (DE); Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 431 days.

(21) Appl. No.: 12/766,570

(22) Filed: Apr. 23, 2010

(65) Prior Publication Data

US 2010/0269497 A1 Oct. 28, 2010

(30) Foreign Application Priority Data

Apr. 27, 2009 (DE) .......................... 10 2009 018 753

(51) Int. Cl.
*F16F 15/14* (2006.01)
*F16D 33/00* (2006.01)

(52) U.S. Cl.
USPC ........................... 192/3.28; 192/30 V; 60/338

(58) Field of Classification Search
USPC .... 192/3.28, 30 V, 55.61, 201, 212; 74/574.2; 60/338; 464/68.2
See application file for complete search history.

(56) References Cited

U.S. PATENT DOCUMENTS

| 2,943,503 | A | * | 7/1960 | Forster | |
|---|---|---|---|---|---|
| 6,006,879 | A | * | 12/1999 | Sudau | 192/30 V X |
| 6,244,401 | B1 | * | 6/2001 | Maienschein et al. | |
| 7,296,667 | B2 | * | 11/2007 | Maienschein et al. | 192/212 X |
| 8,047,344 | B2 | * | 11/2011 | Degler et al. | 192/212 X |
| 2002/0078791 | A1 | * | 6/2002 | Eckel et al. | |
| 2011/0179782 | A1 | * | 7/2011 | Huegel et al. | 60/338 |

FOREIGN PATENT DOCUMENTS

WO WO 2007054062 A1 * 5/2007
WO 2010043194 A1 4/2010

* cited by examiner

*Primary Examiner* — Gregory Binda
*Assistant Examiner* — Matthieu Setliff
(74) *Attorney, Agent, or Firm* — Simpson & Simpson, PLLC

(57) ABSTRACT

A hydrodynamic torque converter with an impeller connected on the drive side arranged in housing and a turbine driven by the latter, connected with the driven side of the torque converter, with a turbine damper actively disposed between the turbine and driven side. To improve the vibration damping on the driven side of the torque converter, the turbine damper with a first damper part is formed out of an input part connected with the turbine and an intermediate flange, limited and rotatable opposite and against the action of at least a first energy accumulator and a second damper part with the intermediate flange and an output part limited and rotatable oppositely and against the action of at least a second energy accumulator. An adaptive-speed vibration absorber is arranged on the intermediate flange.

14 Claims, 2 Drawing Sheets

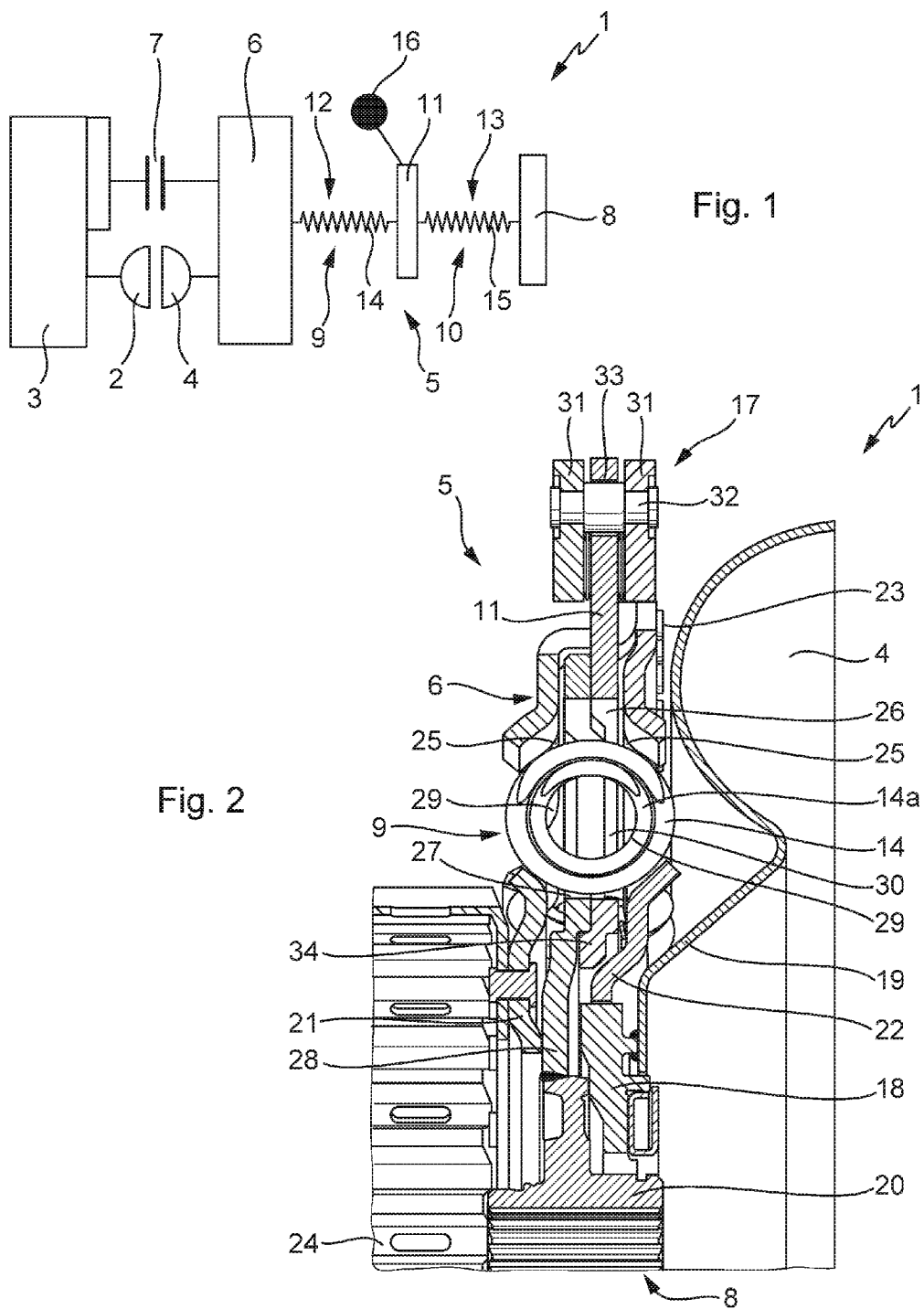

HYDRODYNAMIC TORQUE CONVERTER

CROSS-REFERENCE TO RELATED APPLICATIONS

This application claims priority from German Patent Application No. DE 10 2009 018 753.7, filed Apr. 27, 2009, which application is incorporated herein by reference in its entirety.

FIELD OF THE INVENTION

The invention relates to a hydrodynamic torque converter with an impeller connected on the drive side and arranged in housing, a turbine driven by said impeller, connected with a driven side of the torque converter as well as a turbine damper disposed to act between the turbine and the driven side.

BACKGROUND OF THE INVENTION

Hydrodynamic torque converters with turbine dampers are known. In that case, a torsional vibration damper is actively disposed between the turbine shell and the driven side of the torque converter, in that, for instance, the turbine hub accommodating the turbine shell is rotatably connected on the driven side, for instance, on a converter hub, which is connected rotatably by means of input splined shaft of the transmission. Between the converter hub and the turbine hub in this case, the torsional vibration damper is actively disposed as a turbine damper, so that torsional vibrations from the internal combustion engine driving the impeller, transmitted via the impeller to the turbine, are dampened within the torque converter before torque is transmitted to the input shaft.

With the increase of torque developed by modern internal combustion engines, the following are required—on the one hand more stable designs of turbine dampers and on the other hand—an improved vibration insulation. In the unpublished German application No. 10 2008 051 972.3, a combined torsional vibration damper with a centrifugal force pendulum absorber is proposed for this purpose, in which a multi-stage torsional vibration damper is provided, with which several damper stages with partly different functions and depending on the shifting state of a lock-up clutch are effective, so that a so-called lock-up damper is connected between the lock-up clutch and output part, and are combined together with a turbine damper. The centrifugal force pendulum absorber is, by means of separate pendulum flange, assigned to act directly on the driven side of the torque converter, namely directly on the turbine. Particularly, for compact assembly space requirements, such devices for torsional vibration damping are less suitable and costly, as result of the increased size of mounting space.

BRIEF SUMMARY OF THE INVENTION

The task arises therefore to propose a turbine damper that despite little assembly space requirement, allows an increased insulation capacity of torsional vibrations and is cost-effective in manufacturing.

The task is solved by a hydrodynamic torque converter with an impeller connected on the drive side arranged in a housing and a turbine driven by the latter, connected with the driven side of the torque converter, with a turbine damper actively disposed between the turbine and the driven side, wherein the turbine damper comprises a first damper part formed out of an input part connected with the turbine and an intermediate flange, which is limitedly rotatable against the intermediate flange by the action of at least a first energy accumulator and a second damper part comprising the intermediate flange and an output part which is limitedly rotatable against the intermediate flange by the action of at least a second energy accumulator, wherein an adaptive-speed vibration absorber is arranged on the intermediate flange. By using an intermediate flange, a serial turbine damper can be proposed, with which higher torque can be transmitted. In that case, if applicable, disturbing inherent frequencies and mode shapes of the intermediate flange are effectively avoided by integration of the adaptive-speed vibration absorber in the intermediate flange, so that, in total, an increased insulation capacity of the hydrodynamic torque converter is attained. Due to the series connection of the energy accumulator, a comparatively low, thus soft spring rate is achieved. Furthermore, the adaptive-speed vibration absorber, besides compensating vibration absorption for inherent frequencies and mode shapes of the intermediate flange, contributes to the torsional vibrations fed into the torque converter, so that vibration insulation is attained at a high level with a small assembly-space requirement and comparatively low cost space.

The adaptive-speed damper is advantageously formed as a centrifugal force pendulum absorber, wherein pendulum masses are distributed over the circumference in a manner allowing limited swiveling on the intermediate flange. As a result of increased effectiveness, the disposition of the pendulum masses occurs preferably on the outside circumference of the intermediate flange, wherein the pendulum masses and the intermediate flange feature complementary races, on which common rolling elements roll respectively on both races and hence allow swiveling of the pendulum masses with radial share and circumferential share, so that depending on speed and on prevailing torsional vibrations, a vibration angle adjusts between pendulum masses and intermediate flange, which eliminates torsional vibrations at least partially through change in moments of inertia of the centrifugal force pendulum absorber—pendulum masses and intermediate flange. In that case, the pendulum masses are disposed preferably on both sides of the intermediate part to increase the masses at disposal, wherein two opposite pendulum masses, respectively, can be connected with one another axially through cutouts in the intermediate flange. Appropriate hard or soft limit stops can be provided to limit the swivel action of pendulum masses. The connection elements of pendulum masses opposite one another can be formed separately or by limit-stop buffers or rolling elements.

A particularly advantageous exemplary embodiment of a torque converter proposes a turbine damper, of which the intermediate flange is arranged axially between two disk parts of the input part, wherein the latter are connected with one another radially outside, for instance, by means of rivets along the circumference. In that case, the pendulum masses can be disposed on the intermediate flange such that their least swivel radius ends directly on the outside circumference of the disk part, by maintaining the necessary clearance.

In an advantageous manner, the output part of the damper, which is also the driven side of the torque converter, is formed out of a splined converter hub with a transmission input shaft. With this hub, at least an output-side disk part can be connected as a splined or preferably welded part. In that case, the intermediate flange and at least an output-side disk part can be disposed axially and rotatably on one another. In addition, the intermediate flange can be disposed axially between two output-side disk parts. For instance, intermediate flange and output part can be centered on one another by means of a radially offset or centering noses distributed over the circumference.

The first and second energy accumulators are formed preferentially out of coil springs that are distributed over the circumference and disposed to act in a circumferential direction, wherein the latter are pressurized on their face sides respectively by appropriately disposed pressurizing areas. To increase the stiffness and hence the transmittable torque whilst still providing adequate vibration insulation, several coil springs can be nested inside one another. The coil springs are arranged in cutouts of the intermediate flange, wherein the circumferential limit of the cutouts or breakouts serve as pressurizing areas of the intermediate flanges. The coil springs can be disposed on the same radius. A turbine damper with several damper stages, for instance, can be depicted by coil springs disposed on different radii, in that, they become effective for different torsional angles of the input and output part of the turbine damper. The serial effect of the turbine damper is targeted, in that, several of the energy accumulators act like coil springs between the input part and the intermediate flange and the rest are disposed to act between the intermediate flange and output part. It has proved advantageous when the coil springs are uniformly distributed on the two damper parts; particularly advantageous is an arrangement that alternates over the circumference of the coil springs respectively assigned to the first and second damper parts. In this manner, all coil springs are pressurized on the one hand by the intermediate flange and on the other hand alternately by the input part and output part.

For this, the disk parts flanking intermediate flange on the input side and the disk-shaped output part are spaced axially apart such that the coil springs can be arranged in the cutouts of the intermediate flange and in the cutouts of the disk parts provided for this, including the output-side disk part. In that case, the cutouts in the input- and output-side disk parts are provided such that the circumferential limits of the cutouts only pressurize the coil springs respectively assigned to the input part or output part. The cutouts of the input-side disk parts can feature radially outside supports, for coil springs, against centrifugal force.

Particularly, for the embodiment of the turbine damper with two disk parts as input part, the disk part opposite the turbine can be connected with an output part of a lock-up clutch, which connects as well as rivets the housing with the internal combustion engine to the drive of the torque converter, so that, for a closed lock-up clutch, the torque converter is bypassed and the turbine damper is connected in an active manner in the torque path between an internal combustion engine and transmission input shaft.

BRIEF DESCRIPTION OF THE DRAWINGS

The invention is illustrated in detail, based on the exemplary embodiments depicted in FIGS. 1 and 2. The figures are as follows:

FIG. 1 shows a principal diagram of a torque converter with turbine damper;

FIG. 2 shows a partial section through a designed exemplary embodiment of FIG. 1; and, FIG. 3 shows a partial section through a turbine damper in a further embodiment.

DETAILED DESCRIPTION OF THE INVENTION

Figure 3:
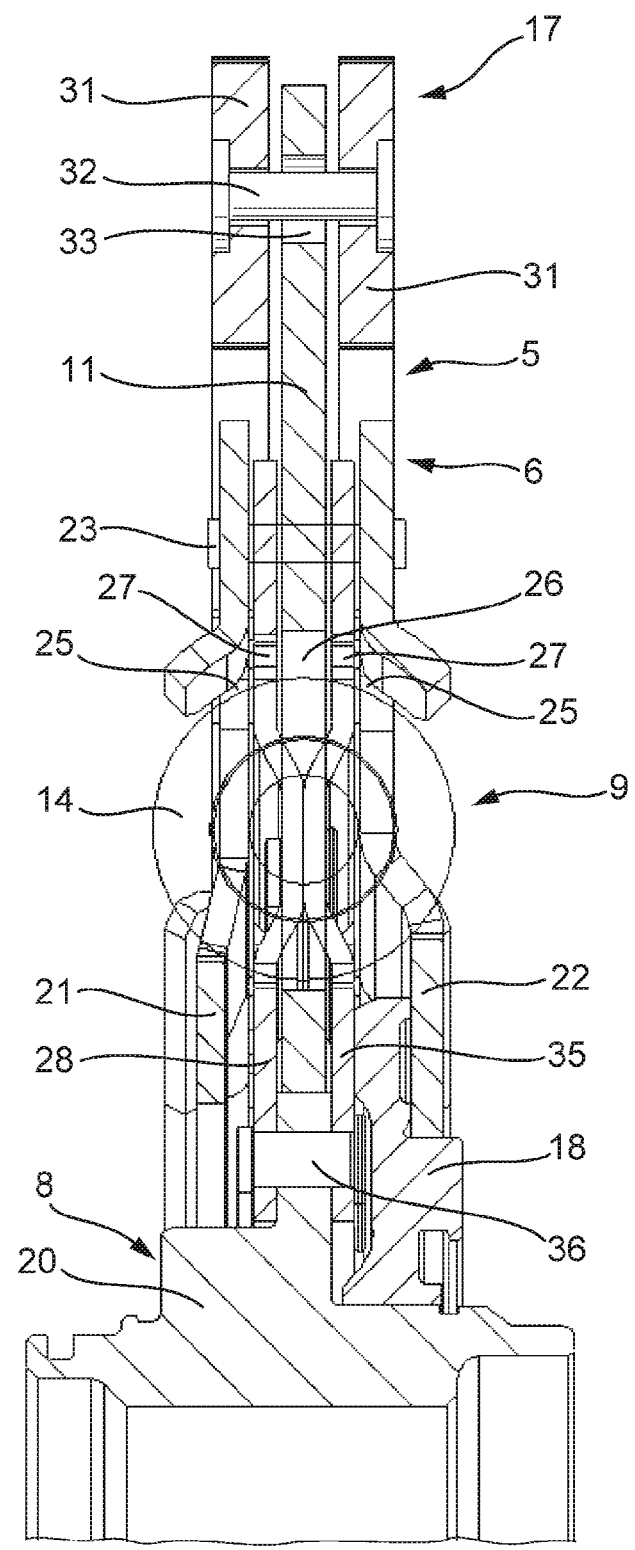

FIG. 1 shows a principal diagram of hydrodynamic torque converter 1. Impeller 2 that can be a component part of housing 3 driven by an internal combustion engine—not depicted—which drives turbine 4 that is connected with input part 6 of turbine damper 5. At the same time, lock-up clutch 7 is connected with input part 6, which bypasses impeller 2 and turbine 4 in the closed state.

Output part 8 of turbine damper 5 is connected with a non-depicted transmission input shaft of a transmission. Turbine damper 5 is designed as series-connected turbine damper 5 with two damper parts 9, 10, wherein intermediate flange 11 separates two damper parts 9, 10 from one another. Damper parts 9, 10 contain, respectively, first and second energy accumulator 12, 13, which are formed respectively by coil springs 14, 15. Intermediate flange 11 contains adaptive-speed vibration absorber 16.

Due to the serial arrangement of damper parts 9, 10 inside turbine damper 5, a low spring rate can be achieved for high stiffness of energy accumulators 12, 13. Through this, soft turbine damper 5 can be proposed for high torque values. The arrangement of the adaptive-speed vibration absorber, for instance, in the form of centrifugal force pendulum absorber 17 enables a support function of the vibration insulation of turbine damper 5 and tuning of adaptive-speed vibration absorber 16 to the respective present inherent frequencies and mode shapes of the intermediate flange.

FIG. 2 shows a design exemplary embodiment of hydrodynamic torque converter 1 of FIG. 1, in a partial section. From torque converter 1, only turbine shell 19 is depicted. Turbine damper 5 is disposed between turbine hub 18 that is fixedly connected with turbine shell 19 of turbine 4 and arranged on hub 20 in a limitedly movable and centered manner. Hub 20 forms output part 8 of turbine damper 5 and the driven side of torque converter 1 and is splined with a transmission input shaft.

Input part 6 of turbine damper 5 is formed by two disk parts 21, 22, which are connected with one another radially outside by means of rivets 23. Disk part 21 is riveted with output part 24 of lock-up clutch 7 (FIG. 1); disk part 22 is splined with turbine hub 18 such that for opened lock-up clutch 7 (FIG. 1), torque is transmitted via turbine 4, and for a closed lock-up clutch, torque is transmitted directly from housing 3 (FIG. 1) into input part 6. Energy accumulators 12 are actively disposed between input part 6 and intermediate flange 11, which are formed by coil springs 14, 14a nested inside one another, and which are arranged in cutouts 25 of disk parts 21, 22, cutouts 26 of the intermediate flanges 11 and cutouts 27 of output-side disk parts 28, which, in turn, is connected and welded with hub 20. Coil springs 14, 14a are pressurized by means of circumferential cutouts 25, 26 limiting pressurizing areas 29, 30, disk parts 21, 22 and intermediate flange 11. Cutouts 27 of output-side disk parts 28 are cut out wider in circumferential direction and do not pressurize coil springs 14, 14a. Output-side disk part 28 and intermediate flange 11 are centered on one another by means of revolving support shoulder 34.

Energy accumulators 13 (FIG. 1), not visible in this section, which are alternately disposed over the circumference with coil springs 14, 14a in the form of similar coil springs, are pressurized by cutouts of intermediate flange 11 and output-side disk part 28 according to non-depicted pressurizing areas. In that case, disk parts 21, 22 are accordingly cut out wide in circumferential direction, such that they do not pressurize these coil springs.

Centrifugal force pendulum absorber 17 is disposed on intermediate flange 11, wherein intermediate flange 11 is formed as a pendulum flange of centrifugal force pendulum absorber 17. Directly radially outside the outside circumference of disk parts 21, 22, pendulum masses 31 are distributed over the circumference and on both sides of intermediate flange 11, wherein the pendulum masses disposed axially oppositely are connected with one another by means of connection bolts 32, which are guided through cutout 33 in intermediate flange 11. Cutouts 33 must be dimensioned such that connection bolts 32 can be displaced without obstruction over their swivel area, wherein connection bolts 32 can be formed as limit stops limiting the swivel area. Pendulum masses 31 are not visible in this partial section although arranged on the intermediate flange in a usual manner. A further embodiment of turbine damper 5 is depicted in FIG. 3. Turbine damper 5 is disposed between turbine hubs 18 and 20 and arranged on hub 20 in a movable and centered manner. Hub 20 forms output part 8 of turbine damper 5 and is splined with a transmission input shaft (not depicted).

Input part 6 of turbine damper 5 is formed by two disk parts 21, 22, which are connected with one another radially outside by means of rivets 23. The output part of turbine damper 5 is formed by two disk parts 28, 35, which are connected, radially inside by means of rivets 36, with one another and with hub 20. Disk part 22 is splined with turbine hub 18. Effective disposed energy accumulators 12 (FIG. 1) of damper part 9, which are formed by coil springs 14, are arranged in cutouts 25 of disk parts 21, 22, in cutouts 26 of intermediate flanges 11 and in cutouts 27 of output-side disk parts 28, 35. Coil springs 14 are pressurized by means of circumferential pressurizing areas (not depicted) of disk parts 21, 22 limiting cutouts 25, 26 and of intermediate flange 11. Cutouts 27 of output-side disk parts 28, 35 are cut out wide in the circumferential direction and do not pressurize coil springs 14.

Energy accumulators 13, not visible in this section, (FIG. 1) of the other damper part 10 (FIG. 1), which alternate over the circumference with coil springs 14 in the form of similar coil springs, are pressurized according to the non-depicted pressurizing areas of cutouts of intermediate flange 11 and of output-side disk parts 28, 35. In that case, disk parts 21, 22 are accordingly cut out wide in circumferential direction, such that they do not pressurize these coil springs.

Centrifugal force pendulum absorber 17 is disposed on intermediate flange 11, wherein intermediate flange 11 is formed as a pendulum flange of centrifugal force pendulum absorbers 17. Radially outside the outer circumference of disk parts 21, 22, pendulum masses 31 are distributed over the circumference and on both sides of intermediate flange 11, wherein pendulum masses 31, lying axially opposite, are connected with one another by means of connection bolt 32 that is guided by cutout 33 in intermediate flange 11. Cutouts 33 are dimensioned such that connection bolts 32 can be displaced without obstruction over their swivel area, wherein connection bolt 32 can be formed as limit stops for limiting the swivel area. Pendulum masses 31 are not visible in this partial section although they are arranged in a common manner on the intermediate flange.

List of Reference Symbols 1 torque converter
2 impeller
3 housing
4 turbine
5 turbine damper
6 input part
7 lock-up clutch
8 output part
9 damper part
10 damper part
11 intermediate flange
12 energy accumulator
13 energy accumulator
14 coil spring
14a coil spring
15 coil spring
16 speed-adaptive vibration damper
17 centrifugal force pendulum absorber
18 turbine hub
19 turbine shell
20 hub
21 disk part
22 disk part
23 rivet
24 output part
25 cut-out
26 cut-out
27 cut-out
28 output-side disk part
29 pressurizing range
30 pressurizing range
31 pendulum mass
32 connection bolts
33 cut-out
34 support shoulder
35 output-side disk part
36 rivet

What we claim is:

1. A hydrodynamic torque converter (1) with:
    an impeller (2) connected on the drive side arranged in a housing (3);
    a turbine (4) driven by the impeller, connected with a driven side of the torque converter (1);
    a turbine damper (5) actively disposed between the turbine (4) and the driven side, wherein:
        the turbine damper (5) comprises:
            a first damper part (9) formed out of an input part (6) connected with the turbine (4) and an intermediate flange (11), the first damper part limitedly rotatable against the intermediate flange (11) by the action of at least a first energy accumulator (12);
            a second damper part (10) comprising the intermediate flange (11) and an output part (8) which is limitedly rotatable against the intermediate flange (11) by the action of at least a second energy accumulator (13); and
            an adaptive-speed vibration absorber (16) arranged on the intermediate flange (11), wherein the adaptive-speed vibration absorber is tuned to provide compensating vibration absorption for inherent frequencies and mode shapes of the intermediate flange.

2. The hydrodynamic torque converter (1) recited in claim 1, wherein the adaptive-speed vibration absorber (16) is formed as a centrifugal force pendulum absorber (17), wherein pendulum masses (31) are disposed on the intermediate flange (11) distributed over the circumference, capable of swiveling in a limited manner.

3. The hydrodynamic torque converter (1) recited in claim 1, wherein:
    the intermediate flange (11) is arranged axially between two disk parts (21, 22) of the input parts (6);
    the two disk parts include respective radially outermost portions; and,
    the two disk parts are connected with one another at the respective radially outermost portions.

4. The hydrodynamic torque converter (1) recited in claim 3, wherein pendulum masses (31) are disposed radially outside the disk parts (21, 22) on both sides of the intermediate flange (11), wherein two opposite pendulum masses (31) are respectively connected with one another axially by cutouts (33) through the intermediate flange (11).

5. The hydrodynamic torque converter (1) recited in claim 3, wherein the output part (8) is formed out of a hub (20) splined with a transmission input shaft of a transmission, with which at least an output-side disk part (28) is connected.

6. The hydrodynamic torque converter (1) recited in claim 5, wherein the intermediate flange (11) and at least an output-side disk part (28) are disposed axially on one another and rotatably relative to one another.

7. The hydrodynamic torque converter (1) recited in claim 6, wherein the at least first and the at least second energy accumulators (12, 13) are formed out of coil springs (14, 14a, 15) distributed over the circumference, acting in a circumferential direction, which are arranged in cutouts (26) of the intermediate flange (11).

8. The hydrodynamic torque converter (1) recited in claim 7, wherein the coil springs (14, 14a, 15) are disposed at a radially common level.

9. The hydrodynamic torque converter (1) recited in claim 7, wherein the coil springs (14, 14a, 15) are alternately pressurized by input part (6) and the output part (8) over the circumference.

10. The hydrodynamic torque converter (1) recited in claim 7, wherein the coil springs (14, 14a, 15) are additionally arranged in cutouts (25, 27) of the disk parts (21, 22) and of the output-side disk parts (28).

11. The hydrodynamic torque converter (1) recited in claim 1, wherein the intermediate flange (11) is centered on the output part (8).

12. The hydrodynamic torque converter (1) recited in claim 1, wherein the input part (6) of the turbine damper (5) is connected with an output part (24) of a lock-up clutch (7) connected with an input part with the housing (3).

13. A torque converter, comprising:
  a housing arranged to receive torque;
  an impeller non-rotatably connected to the housing;
  a turbine hydraulically connected to the turbine;
  a hub arranged to engage an input shaft for a transmission;
  a damper including:
    a disk part non-rotatably connected to the turbine;
    an intermediate flange;
    a first coil spring directly engaged with the disk part and the intermediate flange;
    an output-side disk non-rotatably connected to the hub; and,
    a second coil spring directly engaged with the intermediate flange and the output-side disk; and,
  a centrifugal force pendulum absorber including first and second pluralities of pendulum masses, wherein:
    the intermediate flange includes first and second sides facing in opposite directions;
    respective pairs of pendulum masses from the first and second pluralities of pendulum masses are connected to the intermediate flange radially outward of the first and second coil springs;
    a pendulum mass from the first plurality of pendulum masses in a respective pair of pendulum masses faces the first side of the intermediate flange; and,
    a pendulum mass from the second plurality of pendulum masses in the respective pair of pendulum masses faces the second side of the intermediate flange.

14. A hydrodynamic torque converter (1) with:
  an impeller (2) connected on the drive side arranged in a housing (3);
  a turbine (4) driven by the impeller connected with a driven side of the torque converter (1);
  a turbine damper (5) actively disposed between the turbine (4) and the driven side, wherein:
    the turbine damper (5) comprises:
      a first damper part (9) formed out of an input part (6) connected with the turbine (4) and an intermediate flange (11), the first damper part limitedly rotatable against the intermediate flange (11) by the action of at least a first energy accumulator (12);
      a second damper part (10) comprising the intermediate flange (11) and an output part (8) which is limitedly rotatable against the intermediate flange (11) by the action of at least a second energy accumulator (13); and,
      an adaptive-speed vibration absorber (16) arranged on the intermediate flange (11) radially outward of the input part and is at least partially rotatable with respect to the input part.

* * * * *

(12) EX PARTE REEXAMINATION CERTIFICATE (10612th)
United States Patent
Engelmann et al.

(10) Number: US 8,479,901 C1
(45) Certificate Issued: May 29, 2015

(54) HYDRODYNAMIC TORQUE CONVERTER

(75) Inventors: Dominique Engelmann, Offendorf (FR); Markus Werner, Buehl (DE); Stephan Maienschein, Baden-Baden (DE); Christian Dinger, Lauf (DE)

(73) Assignee: SCHAEFFLER TECHNOLOGIES AG & CO. KG, Herzogenaurach (DE)

Reexamination Request:
No. 90/013,212, Apr. 11, 2014

Reexamination Certificate for:
Patent No.: 8,479,901
Issued: Jul. 9, 2013
Appl. No.: 12/766,570
Filed: Apr. 23, 2010

(30) Foreign Application Priority Data

Apr. 27, 2009 (DE) .................. 10 2009 018 753

(51) Int. Cl.
*F16F 15/14* (2006.01)
*F16D 33/00* (2006.01)
*F16H 45/00* (2006.01)
*F16H 45/02* (2006.01)

(52) U.S. Cl.
CPC .......... *F16F 15/145* (2013.01); *F16H 2045/007* (2013.01); *F16H 2045/0247* (2013.01); *F16H 2045/0263* (2013.01)

(58) Field of Classification Search
None
See application file for complete search history.

(56) References Cited

To view the complete listing of prior art documents cited during the proceeding for Reexamination Control Number 90/013,212, please refer to the USPTO's public Patent Application Information Retrieval (PAIR) system under the Display References tab.

*Primary Examiner* — Robert M Fetsuga

(57) ABSTRACT

A hydrodynamic torque converter with an impeller connected on the drive side arranged in housing and a turbine driven by the latter, connected with the driven side of the torque converter, with a turbine damper actively disposed between the turbine and driven side. To improve the vibration damping on the driven side of the torque converter, the turbine damper with a first damper part is formed out of an input part connected with the turbine and an intermediate flange, limited and rotatable opposite and against the action of at least a first energy accumulator and a second damper part with the intermediate flange and an output part limited and rotatable oppositely and against the action of at least a second energy accumulator. An adaptive-speed vibration absorber is arranged on the intermediate flange.

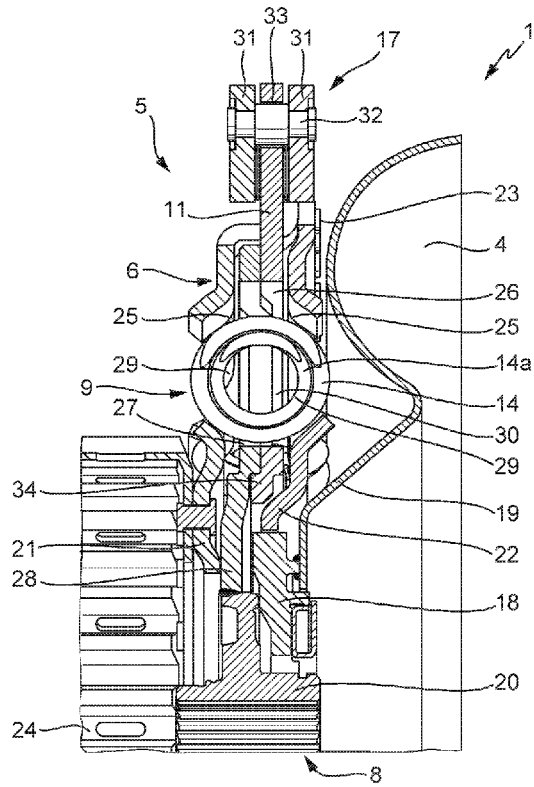

US 8,479,901 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, line 63 and ending on Column 5, line 15:

Centrifugal force pendulum absorber 17 is disposed on intermediate flange 11, wherein intermediate flange 11 is formed as a pendulum flange of centrifugal force pendulum absorber 17. Directly radially outside the outside circumference of disk parts 21, 22, pendulum masses 31 are distributed over the circumference and on both sides of intermediate flange 11, wherein the pendulum masses disposed axially oppositely are connected with one another by means of connection bolts 32, which are guided through cutout 33 in intermediate flange 11. *In view of the foregoing and as shown in FIGS. 2 and 3, centrifugal force pendulum absorber 17 is directly connected to intermediate flange 11. As shown in FIG. 2, the entirety of pendulum masses 31 is radially outward of springs 14 and 15.* Cutouts 33 must be dimensioned such that connection bolts 32 can be displaced without obstruction over their swivel area, wherein connection bolts 32 can be formed as limit stops limiting the swivel area. Pendulum masses 31 are not visible in this partial section although arranged on the intermediate flange in a usual manner. A further embodiment of turbine damper 5 is depicted in FIG. 3. Turbine damper 5 is disposed between turbine hubs 18 and 20 and arranged on hub 20 in a movable and centered manner. Hub 20 forms output part 8 of turbine damper 5 and is splined with a transmission input shaft (not depicted). *As seen in FIG. 2, output-side disk part 28 overlaps, radially inward of springs 14 and 15, disk parts 21 and 22 and intermediate flange 11 in an axial direction. As seen in FIG. 2, respective portions of intermediate flange 11 and output-side disk part 28 are located between disk parts 21 and 22 in an axial direction and radially inward of springs 14 and 15.*

AS A RESULT OF REEXAMINATION, IT HAS BEEN DETERMINED THAT:

Claim 14 is cancelled.

Claims 1 and 13 are determined to be patentable as amended.

Claims 2-12, dependent on an amended claim, are determined to be patentable.

New claims 15 and 16 are added and determined to be patentable.

1. A hydrodynamic torque converter (1) with:
an impeller (2) connected on the drive side arranged in a housing (3);
a turbine (4) driven by the impeller, connected with a driven side of the torque converter (1); *and,*
a turbine damper (5) actively disposed between the turbine (4) and the driven side, wherein:
the turbine damper (5) comprises:
a first damper part (9) formed out of an input part (6) connected with the turbine (4) [and];
an intermediate flange (11), the first damper part limitedly rotatable against the intermediate flange (11) by the action of at least a first energy accumulator (12);
a second damper part (10) comprising the intermediate flange (11) and an output part (8) which is limitedly rotatable against the intermediate flange (11) by the action of at least a second energy accumulator (13); and
an adaptive-speed vibration absorber (16) [arranged on] *directly connected to* the intermediate flange (11), wherein the adaptive-speed vibration absorber is tuned to provide compensating vibration absorption for inherent frequencies and mode shapes of the intermediate flange, *wherein the adaptive-speed vibration absorber (16) includes:*
*first and second pendulum masses (31); and,*
*at least one connection bolt (32):*
*directly connected to the first and second pendulum masses (31); and,*
*passing through the intermediate flange (11).*

13. A torque converter, comprising:
a housing arranged to receive torque;
an impeller non-rotatably connected to the housing;
a turbine hydraulically connected to the [turbine] *impeller*;
a hub arranged to engage an input shaft for a transmission;
a damper including:
a disk part non-rotatably connected to the turbine;
an intermediate flange;
a first coil spring directly engaged with the disk part and the intermediate flange;
an output-side disk non-rotatably connected to the hub *and rotatable with respect to the intermediate flange*; and,
a second coil spring directly engaged with the intermediate flange and the output-side disk; and,
a centrifugal force pendulum absorber including:
first and second pluralities of pendulum masses; *and,*
at least one respective connection bolt:
directly connected to a respective pair of pendulum masses from the first and second pluralities of pendulum masses; and,
passing through the intermediate flange, wherein:
the intermediate flange includes first and second sides facing in opposite directions;
*the* respective [pairs] *pair* of pendulum masses from the first and second pluralities of pendulum masses [are] *is* connected to the intermediate flange *such that entirety of the respective pair of pendulum masses is radially outward of the first and second coil springs*;
a pendulum mass from the first plurality of pendulum masses in [a] *the* respective pair of pendulum masses faces the first side of the intermediate flange; and,
a pendulum mass from the second plurality of pendulum masses in the respective pair of pendulum masses faces the second side of the intermediate flange.

*15. A torque converter, comprising:*
*a housing arranged to be driven;*
*an impeller non-rotatably connected to the housing;*
*a turbine hydraulically connected to the impeller;* a hub arranged to engage an input shaft for a transmission;
a damper including:
  a first disk part non-rotatably connected to the turbine;
  a second disk part connected to the first disk part;
  an intermediate flange;
  a first coil spring directly engaged with the first and second disk parts and the intermediate flange;
  an output-side disk:
    non-rotatably connected to the hub and rotatable with respect to the intermediate flange; and,
    overlapping, radially inward of the first and second springs, the first disk part, the second disks art and the intermediate flange in an axial direction;
  a second coil spring directly engaged with the intermediate flange and the output-side disk; and,
  a centrifugal force pendulum absorber including:
    first and second pendulum masses; and,
    at least one connection bolt:
      directly connected to the first and second pendulum masses; and,
      passing through the intermediate flange radially outward of the first and second coil springs.

16. The torque converter recited in claim 15, wherein respective portions of the intermediate flange and the output-side disk are located:
  between the first and second disk parts in an axial direction; and,
  radially inward of the first and second springs.

* * * * *